United States Patent
Tomono

(10) Patent No.: US 11,041,833 B2
(45) Date of Patent: Jun. 22, 2021

(54) FLOW-THROUGH VIAL AND AUTOMATIC SAMPLER

(71) Applicant: Shimadzu Corporation, Kyoto (JP)

(72) Inventor: Taichi Tomono, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 108 days.

(21) Appl. No.: 16/345,685

(22) PCT Filed: Oct. 26, 2016

(86) PCT No.: PCT/JP2016/081697
§ 371 (c)(1),
(2) Date: Apr. 26, 2019

(87) PCT Pub. No.: WO2018/078737
PCT Pub. Date: May 3, 2018

(65) Prior Publication Data
US 2019/0353625 A1 Nov. 21, 2019

(51) Int. Cl.
*G01N 30/16* (2006.01)
*G01N 35/10* (2006.01)
*G01N 13/00* (2006.01)

(52) U.S. Cl.
CPC ............ *G01N 30/16* (2013.01); *G01N 13/00* (2013.01); *G01N 35/10* (2013.01)

(58) Field of Classification Search
CPC ...... C12M 23/08; C12M 29/06; C12M 29/18; C12M 33/04; C12M 37/04; C12M 47/10;
(Continued)

(56) References Cited

U.S. PATENT DOCUMENTS 4,678,639 A * 7/1987 Dong ................ G01N 13/00
422/70
4,798,798 A * 1/1989 Mehnert ............ C12M 23/08
422/534
(Continued)

FOREIGN PATENT DOCUMENTS

| JP | S60-205232 A | 10/1985 |
| JP | H09-222408 A | 8/1997 |
| JP | 2004-226371 A | 8/2004 |

OTHER PUBLICATIONS

Office Action from the JPO dated Jan. 7, 2020, for counterpart Japanese Patent Application No. 2018-546983.
(Continued)

*Primary Examiner* — Nimeshkumar D Patel
*Assistant Examiner* — Gedeon M Kidanu
(74) *Attorney, Agent, or Firm* — Muir Patent Law, PLLC

(57) ABSTRACT

A flow-through vial includes: a columnar internal space for containing a liquid; a liquid introduction part provided in a lower portion of a side surface for guiding the liquid to the internal space in a direction oblique to a radial direction in a horizontal cross section of the internal space; a liquid discharge part provided in an upper portion of the side surface for guiding the liquid in the internal space to outside; and an upper surface sealing member for sealing an upper surface of the internal space, the upper surface sealing member being made of an elastic material which can be penetrated by a needle descending from above.

5 Claims, 4 Drawing Sheets

(58) Field of Classification Search
CPC . C12M 47/12; G01N 13/00; G01N 2013/006; G01N 2035/00198; G01N 33/15; G01N 35/00

See application file for complete search history.

(56) References Cited

U.S. PATENT DOCUMENTS

| | | | |
|---|---|---|---|
| 2007/0299419 A1* | 12/2007 | Vancaillie | A61J 1/2089 604/416 |
| 2013/0206391 A1* | 8/2013 | Gordon | B29D 99/0053 166/162 |
| 2017/0227438 A1* | 8/2017 | Schmidt | A61B 5/14535 |

OTHER PUBLICATIONS

Japanese Decision for corresponding patent application No. 2018-546983, dated May 12, 2020, submitted with a machine translation.
First Office Action from the Chinese Intellectual Property Office for corresponding application No. 201680087750.4 dated Oct. 21, 2020, submitted with a machine translation.

\* cited by examiner

FLOW-THROUGH VIAL AND AUTOMATIC SAMPLER

TECHNICAL FIELD

The present invention relates to a flow-through vial capable of automatically containing an analytical sample and an autosampler for collecting a sample through such a flow-through vial and introducing it into an analyzer.

BACKGROUND ART

As an example, when a sample supply source is not in the vicinity of an analyzer, an analysis system is constructed in which a sample is collected by drawing from the sample supply source and is introduced into an analyzer to be analyzed. In such an analysis system, an autosampler incorporating a flow-through vial capable of accommodating a sample drawn from the sample supply source is generally used.

In the flow-through vial, a liquid inlet for introducing the sample is provided in a lower portion of a side surface, and a liquid outlet for discharging the sample to outside is provided in an upper portion of the side surface. An upper surface of the flow-through vial is sealed by a septum penetrable by a needle. A pipe from the sample supply source is connected to the liquid inlet for the sample, and the sample sent from the sample supply source is automatically stored in the flow-through vial.

Such an autosampler is equipped with a needle for collecting a sample in the flow-through vial. The needle is movable at least vertically, passes through the septum sealing the upper surface of the flow-through vial by descending from a position above the flow-through vial, and sucks the sample in the flow-through vial. The needle that sucked the sample then dispenses the sample into another dispensing container or injects the sample into the analyzer via an injection port leading to the analyzer.

With the above configuration, it is unnecessary for a user to collect the sample in the vial and install the vial at a predetermined position of the autosampler, and even if the sample supply source and the autosampler are at distant positions, the sample is automatically contained in the vial and introduced into the analyzer.

SUMMARY OF THE INVENTION

Problems to be Solved by the Invention

In an autosampler incorporating a flow-through vial, when a sample from a sample supply source flows into the flow-through vial at high speed (for example, 50 mL/min or more), turbulence occurs in the flow-through vial, and bubbles may be generated in the flow-through vial. When sample suction is performed by a needle in a state in which the bubbles are generated in the flow-through vial, quantitativeness of the sample suction by the needle is impaired, thereby influencing an analysis result.

In view of the above, an object of the present invention is to suppress generation of bubbles in a flow-through vial to thereby improve quantitativeness of sample suction by a needle.

Solutions to the Problems

A flow-through vial according to the present invention includes: a columnar internal space for containing a liquid; a liquid introduction part provided in a lower portion of a side surface for guiding the liquid to the internal space in a direction oblique to a radial direction in a horizontal cross section of the internal space; a liquid discharge part provided in an upper portion of the side surface for guiding the liquid in the internal space to outside; and an upper surface sealing member for sealing an upper surface of the internal space, the upper surface sealing member being made of an elastic material which can be penetrated by a needle descending from above.

In the flow-through vial of the present invention, since the liquid introduction part guides the liquid to the internal space in the direction oblique to the radial direction in the horizontal cross section of the internal space, the liquid easily flows in the internal space, and turbulence hardly occurs.

In order to further suppress occurrence of the turbulence in the internal space, it is preferable that the liquid introduction part be provided so as to introduce the liquid into the internal space of the flow-through vial in a direction along an inner peripheral surface of the internal space. Then, the liquid introduced into the flow-through vial is introduced along the inner peripheral surface of the internal space, the turbulence is less likely to occur, and generation of bubbles is suppressed.

The liquid discharge part may be provided so as to discharge the liquid in the internal space to outside of the internal space in a direction oblique to the radial direction in the horizontal cross section of the internal space.

In a preferred embodiment in the above case, the liquid discharge part has a discharge flow path along a flow direction of the liquid formed in the internal space. It is considered that, by providing the liquid introduction part so as to guide the liquid in the direction oblique to the radial direction in the horizontal cross section of the internal space, a spiral flow is formed in the internal space. Therefore, since the liquid discharge part has the discharge flow path along the flow, it becomes possible to efficiently discharge the liquid from the liquid discharge part by using the spiral flow, and replacement efficiency of the flow-through vial is improved.

An autosampler according to the present invention includes: a flow-through vial having a columnar internal space for containing a liquid, and having an upper surface sealed by a sealing member made of an elastic material; a liquid introduction part provided in a lower portion of a side surface of the flow-through vial for introducing a fed liquid into the internal space in a direction oblique to a radial direction in a horizontal cross section of the internal space; a liquid discharge part for discharging the liquid in the internal space from an upper portion of the side surface of the flow-through vial; and a needle moving at least vertically with a tip facing downward, the needle descending from a position above the flow-through vial to penetrate the sealing member, and sucking the liquid contained in the internal space of the flow-through vial.

In the autosampler of the present invention, the liquid is introduced into the internal space of the flow-through vial in the direction oblique to the radial direction in the horizontal cross section of the internal space, so that the liquid easily flows in the internal space, and turbulence hardly occurs.

In order to further suppress occurrence of the turbulence in the internal space of the flow-through vial, it is preferable that the liquid introduction part introduce the liquid being supplied into the internal space in a direction along an inner peripheral surface of the internal space. Then, the liquid introduced into the flow-through vial is introduced along the inner peripheral surface of the internal space, the turbulence is less likely to occur, and generation of bubbles is suppressed.

The liquid discharge part may discharge the liquid in the internal space to outside of the internal space in a direction oblique to the radial direction in the horizontal cross section of the internal space.

In a preferred embodiment in the above case, the liquid discharge part has a discharge flow path along a flow direction of the liquid formed in the internal space. Since the liquid discharge part has the discharge flow path along the flow of the liquid formed in the internal space, it is possible to efficiently discharge the liquid from the liquid discharge part by using a spiral flow, and replacement efficiency of the flow-through vial is improved.

Effects of the Invention

In the flow-through vial according to the present invention, since the liquid introduction part guides the liquid into the internal space in the direction oblique to the radial direction in the horizontal cross section of the internal space, turbulence is difficult to occur in the internal space, and generation of bubbles is suppressed. As a result, a suction defect of the liquid caused by sucking bubbles by the needle hardly occurs, and quantitativeness of liquid suction by the needle is improved.

In the autosampler according to the present invention, since the liquid is introduced into the internal space of the flow-through vial in the direction oblique to the radial direction in the horizontal cross section of the internal space, turbulence is less likely to occur in the internal space, and generation of bubbles is suppressed. As a result, a suction defect of the liquid caused by sucking bubbles by the needle hardly occurs, and quantitativeness of liquid suction by the needle is improved.

EMBODIMENT OF THE INVENTION

One embodiment of a flow-through vial and an autosampler will be described below with reference to the drawings.

Figure 1:
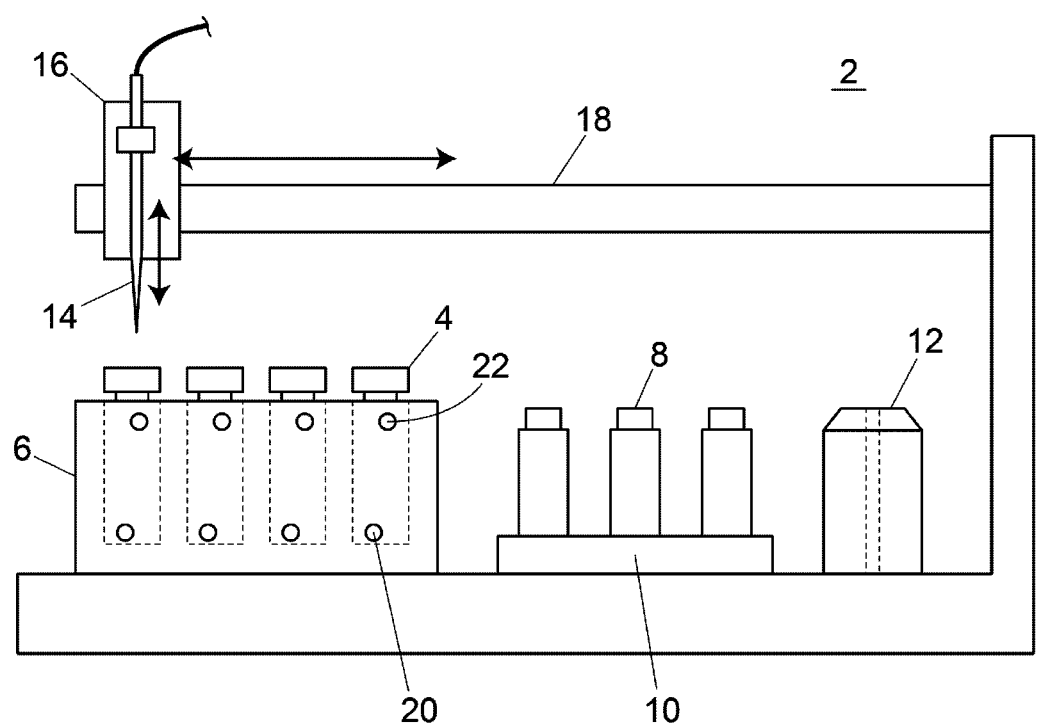
FIG. 1 is a configuration diagram schematically showing an embodiment of an autosampler.

A configuration of the autosampler according to the one embodiment will be described with reference to FIG. 1.

An autosampler 2 of this embodiment has a plurality of flow-through vials 4. The flow-through vial 4 is held in a dedicated rack 6. At positions different from the flow-through vials 4, a dispensing container unit 10 for holding a plurality of dispensing containers 8 and an injection port 12 are provided. The injection port 12 is connected, via a flow path, to an analyzer such as a liquid chromatograph provided apart from the autosampler 2.

A needle assembly 16 for holding a needle 14 for sucking and discharging a liquid is provided at a position above the flow-through vials 4, the dispensing container unit 10, and the injection port 12. The needle 14 is configured so as to be able to move in a horizontal direction and a vertical direction in a state in which a tip thereof faces vertically downward. In this embodiment, the needle assembly 16 moves horizontally along a guide rail 18 extending in the horizontal direction, and the needle assembly 16 moves the needle 14 in the vertical direction.

A liquid introduction part 20 for introducing a liquid into an internal space is provided at a lower portion of a side surface of the flow-through vial 4 held by the rack 6, and a liquid discharge part 22 for discharging the liquid in the internal space is provided at an upper portion of the side surface of the flow-through vial 4. A flow path from a sample supply source is connected to the liquid introduction part 20, and a liquid sample supplied from the sample supply source is introduced into the internal space of the flow-through vial 4 from a bottom side, and is discharged to outside from the liquid discharge part 22 provided above the liquid introduction part.

The needle 14 can descend from a position above any one of the flow-through vials 4 to insert the tip into the internal space and suck the sample introduced into the internal space of the flow-through vial 4. The needle 14 which sucked the sample from the flow-through vial 4 thereafter dispenses the sample into a predetermined dispensing container 8 or injects the sample into the analyzer via the injection port 12.

Figure 2A:
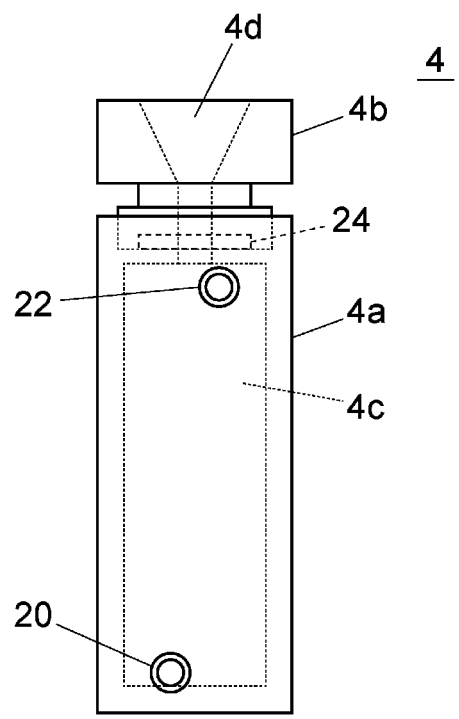
FIG. 2A is a front view of a flow-through vial of the embodiment.
Figure 2B:
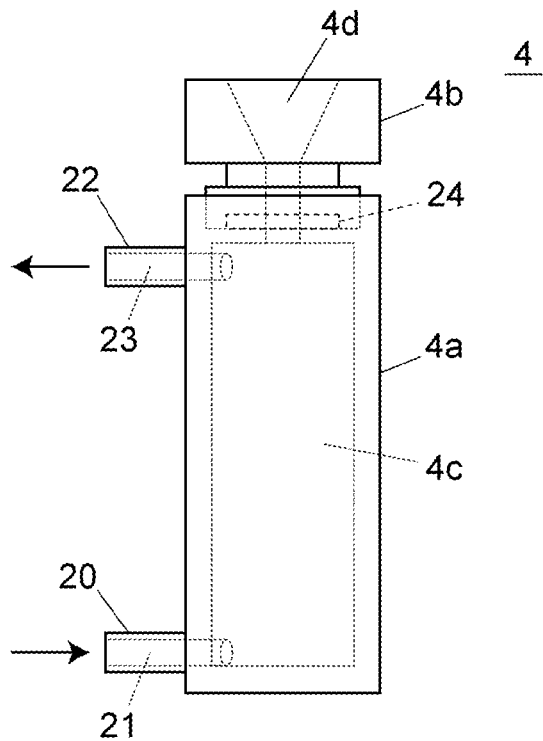
FIG. 2B is a side view of the flow-through vial.

Here, an example of the structure of the flow-through vial 4 will be described with reference to FIGS. 2A and 2B.

The flow-through vial 4 includes a main body 4a having a cylindrical internal space 4c for containing a liquid and a cover 4b attached to an upper portion of the main body 4a. The cover 4b has a through hole 4d for guiding the needle 14 to the internal space 4c. An edge of the through hole 4d on an upper surface of the cover 4d is tapered so as to lead the tip of the needle 14 descending from above to a center of the through hole 4d.

A septum 24 (upper surface sealing member) for sealing an upper surface of the internal space 4c is provided in a portion of an upper end of the main body 4a to which the cover 4b is attached. The septum 24 is made of an elastic material that can be penetrated by the needle 14, and even after the needle 14 has penetrated the septum 24, elasticity thereof can maintain a sealed state of the internal space 4c.

The liquid introduction part 20 protrudes in the horizontal direction from a lower portion of a side surface of the main body 4a, and a flow path 21 communicating with the vicinity of a bottom portion of the internal space 4c is provided inside the liquid introduction part 20. The liquid discharge part 22 protrudes in the horizontal direction from an upper portion of the side surface of the main body 4b, and a flow path 23 communicating with an upper portion of the internal space 4c is provided inside the liquid discharge part 22.

Structures of the liquid introduction part 20 and the liquid discharge part 22 will be described with reference to FIGS. 3A and 3B.

Figure 3A:
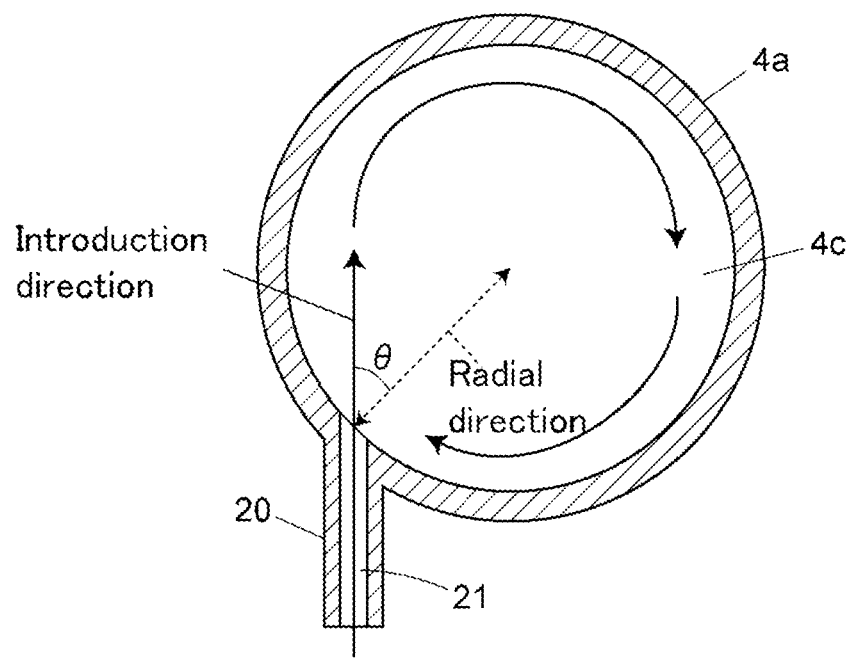
FIG. 3A is a horizontal sectional view at a height of a liquid introduction part for explaining a structure of the liquid introduction part.
Figure 3B:
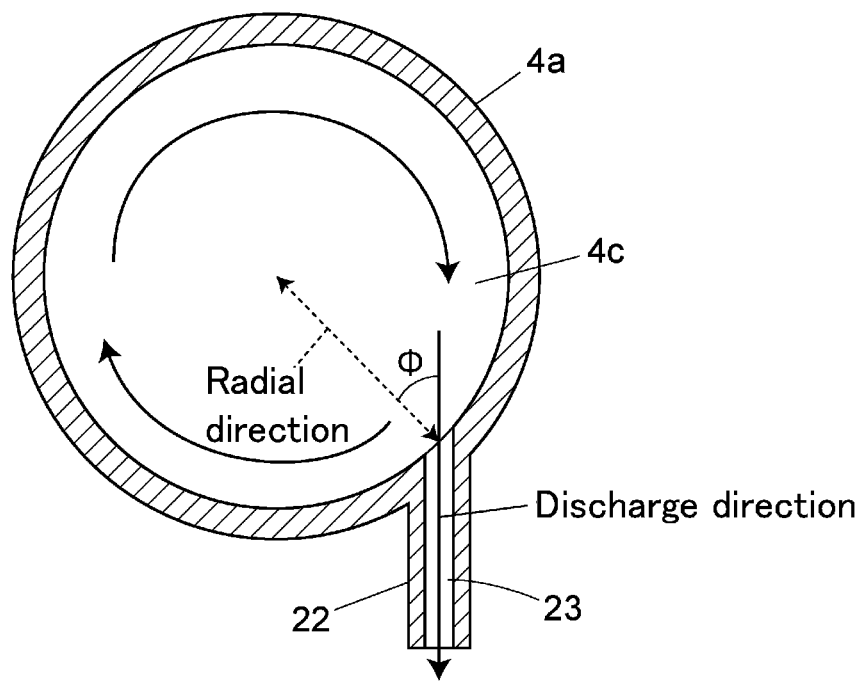
FIG. 3B is a horizontal sectional view at a height of a liquid discharge part for explaining a structure of the liquid discharge part.

As shown in FIG. 3A, the liquid introduction part 20 is provided so that an introduction direction of a liquid is inclined with respect to a radial direction in a horizontal cross section of the internal space 4c. Although there is no particular limitation on an angle θ formed between the introduction direction of the liquid and the radial direction, as θ is larger (where θ<90°), the liquid is introduced from the liquid introduction part 20 to the internal space 4c along an inner peripheral surface of the internal space 4c. By introducing the liquid into the internal space 4c along the inner peripheral surface of the internal space 4c, a spiral flow is formed in the internal space 4c. As a result, turbulence caused by the liquid introduced from the liquid introduction part 20 hardly occurs in the internal space 4c, and generation of bubbles is suppressed.

In order to effectively suppress the generation of bubbles in the internal space 4c, the angle θ formed between the introduction direction of the liquid and the radial direction is preferably 60 degrees or more.

In this embodiment, a discharge direction of a liquid, that is, the flow path 23 provided in the liquid discharge part 22, is provided so as to be inclined with respect to the radial direction in the horizontal cross section of the internal space 4c. It is not necessary that the flow path is inclined with respect to the radial direction as described above, but since the flow path 23 is provided in a direction along the spiral flow of the liquid formed in the internal space 4c, the liquid which has reached the upper portion of the internal space 4c is discharged to the outside through the flow path 23 on the spiral flow. Therefore, discharge efficiency of the liquid from the internal space 4c is improved. Thereby, replacement efficiency of the liquid in the flow-through vial 4 is improved.

As an angle Φ formed between the discharge direction of the liquid and the radial direction is larger (where Φ<90°), the discharge direction of the liquid follows the spiral flow formed in the internal space 4, thereby improving the liquid discharge efficiency. In order to effectively increase the discharge efficiency of the liquid from the internal space 4, Φ is preferably 60 degrees or more.

The present inventor verified an occurrence probability of suction defects by a needle using the flow-through vial of the above structure. In the flow-through vial used for this verification, an inner diameter of the internal space 4c of the main body 4a was 4 mm, inner diameters of the flow path 21 of the liquid introduction part 20 and the flow path 23 of the liquid discharge part 22 communicating with the internal space 4c were both 1 mm. In order to make a comparison, one (verification vial) provided with the liquid introduction part 20 so that an introduction direction of a liquid is inclined with respect to the radial direction in the horizontal cross section of the internal space 4c, and one (reference vial) provided with the liquid introduction part 20 so that the introduction direction of the liquid is in the same direction as the radial direction in the horizontal cross section of the internal space 4c were used.

As a result of the above verification, in a case of using the reference vial, several suction defects occurred in 130 times, but in a case of using the verification vial, even when liquid suction with the needle was performed 160 times, no suction defect occurred. Accordingly, it was found that, by providing the liquid introduction part 20 so that the introduction direction of liquid is inclined with respect to the radial direction in the horizontal cross section of the internal space 4c, generation of bubbles in the internal space 4c is suppressed and the suction defect of the liquid by the needle can be prevented.

The embodiment described above is only an example of the embodiment of the present invention. The number of the flow-through vials 4 may be any number, and the structure of the flow-through vial 4 is not limited to the one mentioned above. For example, in the above-described embodiment, the liquid introduction part 20 and the liquid discharge part 22 extend in the horizontal direction from the side surface of the main body 4a of the flow-through vial 4, but may be inclined either upward or downward.

As a mechanism for driving the needle 14, any mechanism may be used as long as it moves the needle 14 in the horizontal direction and the vertical direction. In addition, although both the dispensing container unit 10 and the injection port 12 are provided in the autosampler of FIG. 1, only one of them may be provided.

DESCRIPTION OF REFERENCE SIGNS

2: Autosampler
4: Flow-through vial
4a: Main body
4b: Cover
4c: Internal space
4d: Through hole
6: Rack
8: Dispensing container
10: Dispensing container unit
12: Injection port
14: Needle
16: Needle assembly
18: Guide rail
20: Liquid introduction part
21, 23: Flow path
22: Liquid discharge part
24: Septum (upper surface sealing member)

The invention claimed is:

1. An autosampler comprising:
a flow-through vial and a needle, wherein
the flow-through vial comprises:
a main body comprising a columnar internal space for containing a liquid;
a liquid introduction part provided in a lower portion of a side surface of the main body, comprising an introduction flow path in fluid communication with the internal space, and for guiding the liquid to the internal space through the introduction flow path;
a liquid discharge part provided in an upper portion of the side surface of the main body, comprising a discharge flow path in fluid communication with the internal space, and for guiding the liquid in the internal space to outside through the discharge flow path; and
an upper surface sealing member for sealing an upper surface of the internal space, the upper surface sealing member being made of an elastic material which can be penetrated by the needle descending from above,
wherein the introduction flow path of the liquid introduction part forms an angle θ (0<θ<90°) with respect to a direction of a radius connecting a connecting portion of the introduction flow path to the internal space and a center in a horizontal cross section of the internal space, and the liquid introduction part is provided so as to introduce the liquid into the internal space in a direction along an inner peripheral surface of the internal space, to suppress occurrence of turbulence, and to suppress generation of bubbles,
wherein the needle moves at least vertically with a tip facing downward, the needle is provided for descending from a position above the flow-through vial to penetrate the sealing member, and sucking the liquid contained in the internal space of the flow-through vial, and
wherein a sample from a sample supply source is introduced into the flow-through vial at a flow rate of 50 mL/min or more.

2. The autosampler according to claim 1, wherein the angle θ is 60° or more and less than 90°.

3. The autosampler according to claim 1, wherein the discharge flow path of the liquid discharge part forms an angle Φ (0<Φ<90°) with respect to a direction of a radius connecting a connecting portion of the discharge flow path to the internal space and the center in the horizontal cross section of the internal space.

4. The autosampler according to claim 3, wherein the discharge flow path of the liquid discharge part is provided along a flow direction of the liquid formed in the internal space.

5. The autosampler according to claim 3, wherein the angle Φ is 60° or more.

\* \* \* \* \*